(12) United States Patent
Itkin (10) Patent No.: US 10,984,107 B2
(45) Date of Patent: Apr. 20, 2021

(54) SECURE BOOT

(71) Applicant: Mellanox Technologies, Ltd., Yokneam (IL)

(72) Inventor: Yuval Itkin, Zoran (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 256 days.

(21) Appl. No.: 15/960,576

(22) Filed: Apr. 24, 2018

(65) Prior Publication Data
US 2019/0325137 A1    Oct. 24, 2019

(51) Int. Cl.
| | | |
|---|---|---|
| G06F 7/04 | (2006.01) |
| G06F 21/44 | (2013.01) |
| G06F 21/57 | (2013.01) |
| G06F 21/62 | (2013.01) |
| H04L 9/30 | (2006.01) |

(52) U.S. Cl.
CPC ............ *G06F 21/572* (2013.01); *G06F 21/44* (2013.01); *G06F 21/575* (2013.01); *G06F 21/6209* (2013.01); *H04L 9/30* (2013.01)

(58) Field of Classification Search
CPC ...... G06F 21/572; G06F 21/44; G06F 21/575; G06F 21/6209; H04L 9/30
See application file for complete search history.

(56) References Cited

U.S. PATENT DOCUMENTS

| | | | | |
|---|---|---|---|---|
| 9,177,122 | B1 | 11/2015 | Trier | |
| 2003/0028800 | A1* | 2/2003 | Dayan | G06F 11/1433 726/34 |
| 2003/0188176 | A1* | 10/2003 | Abbondanzio | G06F 21/575 713/191 |
| 2004/0024860 | A1* | 2/2004 | Sato | G06F 21/10 709/223 |
| 2005/0021968 | A1* | 1/2005 | Zimmer | G06F 21/572 713/176 |
| 2007/0192610 | A1* | 8/2007 | Chun | G06F 21/64 713/176 |
| 2007/0300207 | A1* | 12/2007 | Booth | G06F 21/575 717/126 |

(Continued)

OTHER PUBLICATIONS

PCI Express® Base Specification, Revision 4.0, Version 0.3, 1053 pages, Feb. 19, 2014.

(Continued)

*Primary Examiner* — Darshan I Dhruv
(74) *Attorney, Agent, or Firm* — Kligler & Associates Patent Attorneys Ltd (57) ABSTRACT

A method for secure boot includes, in a processor, retrieving from a memory device a firmware boot code for bootstrapping a firmware of the processor. The firmware boot code is authenticated using an authentication key. In response to failing to authenticate the firmware boot code using the authentication key, an attempt is made to authenticate a recovery firmware code, which has reduced functionality relative to the firmware boot code, using a recovery key. Upon successfully authenticating the recovery firmware code using the recovery key, the firmware boot code is restored from a host, the restored firmware boot code is authenticated by executing the recovery firmware code, and the firmware is bootstrapped using the authenticated firmware boot code.

10 Claims, 4 Drawing Sheets

(56) References Cited

U.S. PATENT DOCUMENTS

| | | | |
|---|---|---|---|
| 2008/0165952 A1* | 7/2008 | Smith | G06F 21/575 380/28 |
| 2009/0063108 A1* | 3/2009 | De Atley | G06F 21/575 703/2 |
| 2012/0166781 A1* | 6/2012 | de Cesare | H04N 7/162 713/1 |
| 2012/0210115 A1* | 8/2012 | Park | H04L 9/3247 713/2 |
| 2013/0024677 A1* | 1/2013 | Smith | G06F 21/575 713/1 |
| 2013/0036298 A1* | 2/2013 | De Atley | H04L 63/08 713/1 |
| 2013/0047031 A1* | 2/2013 | Tabone | G06F 9/4403 714/15 |
| 2013/0254906 A1* | 9/2013 | Kessler | G06F 21/57 726/34 |
| 2013/0262612 A1* | 10/2013 | Langas | G06F 21/6218 709/211 |
| 2014/0317350 A1* | 10/2014 | Langas | G06F 1/266 711/115 |
| 2015/0058979 A1* | 2/2015 | Peeters | G06F 21/575 726/22 |
| 2016/0266894 A1 | 9/2016 | Panicker et al. | |
| 2017/0063539 A1* | 3/2017 | Balakrishnan | G06F 11/1402 |
| 2017/0346631 A1* | 11/2017 | De Atley | H04L 9/3249 |

OTHER PUBLICATIONS

Unified Extensible Firmware Interface (UEFI) Specification, Version 2.7—Errata A, Chapter 31, pp. 1765-1798, Aug. 2017.

Implementation Guidance for FIPS 140-2 and the Cryptographic Module Validation Program, National Institute of Standards and Technology Communications Security Establishment, 237 pages, Mar. 28, 2003.

FIPS PUB 140-2—"Security Requirements for Cryptographic Modules", 69 pages, May 25, 2001.

PKCS#1—Cryptography Standard, Version 2.2, published by RSA Laboratories, 63 pages, Oct. 27, 2012.

FIPS PUB 180-4—"Secure Hash Standard (SHS)", 36 pages, Aug. 2015.

FIPS PUB 198-1—"The Keyed-Hash Message Authentication Code (HMAC)", 13 pages, Jul. 2008.

* cited by examiner

SECURE BOOT

FIELD OF THE INVENTION

The present invention relates generally to secure recovery of computer systems, and particularly to methods and systems for secure firmware loading from a host computer.

BACKGROUND OF THE INVENTION

Malware, short for Malicious Software, uses many sophisticated tools and attack techniques to steal data or inflict damage on computer systems. Some malware types target the firmware that starts up computer systems—the bootstrap code. The bootstrap code firmware is usually stored in read-only or read-mostly devices, such as FLASH, EPROM and EEPROM. Protecting the firmware is challenging because the firmware starts before any software is loaded, including any software which may check for malware; moreover, as it is desirable to allow loading of new firmware for updates and for repair, firmware protection must cover firmware loaded from remote sources.

Numerous methods have been devised to verify the reliability of the firmware and protect it against attacks, for example in "SECURITY REQUIREMENTS FOR CRYPTOGRAPHIC MODULES, Implementation Guidelines", NIST-FIPS 140-2, initially released on Mar. 28, 2003; in "The Keyed-Hash Message Authentication Code", FIPS PUB 198-1, July 2008; in "Secure Hash Standard (SHS)," NIST-FIPS 180-4, August, 2015; and in "UEFI (Unified Extensible Firmware Interface Forum) specifications," version 2.7 (Errata A), August 2017. All four documents are incorporated herein by reference.

SUMMARY OF THE INVENTION

An embodiment of the present invention that is described herein provides a method for secure boot including, in a processor, retrieving from a memory device a firmware boot code for bootstrapping a firmware of the processor. The firmware boot code is authenticated using an authentication key. In response to failing to authenticate the firmware boot code using the authentication key, an attempt is made to authenticate a recovery firmware code, which has reduced functionality relative to the firmware boot code, using a recovery key. Upon successfully authenticating the recovery firmware code using the recovery key, the firmware boot code is restored from a host, the restored firmware boot code is authenticated by executing the recovery firmware code, and the firmware is bootstrapped using the authenticated firmware boot code.

In some embodiments, the method further includes, in response to failing to authenticate the recovery firmware code using the recovery key, loading the recovery firmware code from the host. In some embodiments, the reduced functionality of the recovery firmware code includes authentication and signing of firmware boot codes.

In an embodiment, authenticating the restored firmware boot code includes authenticating a signature of the firmware boot code using a public key. In an example embodiment, the method further includes, upon successfully authenticating the signature of the firmware boot code using the public key, signing the restored firmware boot code with a device-unique key associated with the processor, and writing the signed firmware boot code to the memory device.

There is additionally provided, in accordance with an embodiment of the present invention, a computer system including a memory device and a processor. The processor is configured to retrieve from the memory device a firmware boot code for bootstrapping a firmware of the processor, to authenticate the firmware boot code using an authentication key, to attempt, in response to failing to authenticate the firmware boot code using the authentication key, to authenticate a recovery firmware code, which has reduced functionality relative to the firmware boot code, using a recovery key, and, upon successfully authenticating the recovery firmware code using the recovery key, to restore the firmware boot code from a host, to authenticate the restored firmware boot code by executing the recovery firmware code, and to bootstrap the firmware using the authenticated firmware boot code.

The present invention will be more fully understood from the following detailed description of the embodiments thereof, taken together with the drawings in which:

DETAILED DESCRIPTION OF EMBODIMENTS

Overview

Secure Boot is the process which authenticates the loaded software/FW before it is being used. One example of a secure boot process is defined in NIST-FIPS Publication 180-4, which was cited above.

The following terms will be used in the foregoing description:

Boot FW—Firmware used to bootstrap a processor.

FW ROM—read-only memory, typically embedded in the processor chip. Contains the initial part of the bootstrap. Assumed to be trusted.

FW Flash—a flash memory, typically external to the processor, which is used to store the Boot FW.

GA FW—General Availability Boot FW. Production Boot FW.

Recovery FW—Reduced functionality Boot FW. Used to recover from failed GA FW boot.

SHA2—Secure Hash Algorithm 2—a set of cryptographic hash functions, defined in NIST Publication 180-4 (cited above).

HMAC—keyed-hash message authentication code. A code derived by applying a cryptographic function (e.g. SHA2) to a code to be authenticated, using a Key.

Key—a number, which is used in authentication and encryption/decryption processes. A Key is typically a random number, and usually comprises hundreds of bits. Two types of keys are used for secure boot in the embodiments described herein: DUK and Recovery-Key. Other keys may be used to protect other system secrets; e.g. to encrypt other keys.

DUK—a unique device key. Programmed once during production time, and used for signing and for authenticating a secure-boot FW. This key is only accessible to the HMAC HW, and is invisible to FW.

Recovery-Key—used for signing and for authenticating secure recovery boot in case boot with the DUK fails. It is programmed initially during production, but may also be securely updated, as will be described hereinafter. Recovery-Key is accessible to the HMAC HW and is inaccessible to FW.

RoT—Root of Trust. A known trusted entity used for authenticating the loaded software or firmware. This trusted entity is the only element which is not authenticated in the boot process, and it is assumed to be unconditionally trusted. The RoT is based on FW programmed in on-chip ROM, typically augmented by on-chip HW acceleration resources, to perform the measurement operation of the loaded code.

When the FW code is stored in FW Flash, a message authentication code (e.g. RMAC) is calculated on the code using one of the Keys, and the result is stored typically in the same memory where the code is stored. This operation is herewith referred to as "signing," and the result of the message authentication code is referred to as "signature."

when the Boot FW code is read from the FW Flash, the same message authentication code is calculated with the read code and the key. The result is compared with the signature. This operation is referred to hereinafter as Authentication.

According to embodiments of the present invention, if the authentication of the boot FW code with the DUK fails, the processor will attempt to authenticate the boot FW with a Recovery-Key. Thereafter, if the authentication with the Recovery-Key also fails, the processor will enter a Secure Recovery Mode, and an external FW-update host computer (which can be, for example, a general-purpose CPU) will load a Recovery FW to the FW Flash. The Recovery FW is pre-signed with a recovery key. The processor will remain in Secure Recovery Mode until it is reset.

In a subsequent boot process, after the system is reset, authentication of the boot FW with the DUK will fail again, but authentication with the Recovery-Key will pass.

After the processor securely boots with the Recovery FW, it will be able to securely reprogram the GA FW, and will then be able to sign the GA FW with the DUK.

Embodiments of the present invention also comprise means for the processor to securely obtain one or more new Recovery Keys from a remote maintenance center, through a wide-area network.

In an embodiment, the process of sending and applying a new Recovery Key by the remote maintenance center comprises the following steps:

a) The remote maintenance center encrypts the new Recovery Key with a special maintenance private key, for example using RSA Encryption. RSA is a public key cryptography standard, defined in PKCS #1 Cryptography Standard, Version 2.2, published by RSA Laboratories on Oct. 27, 2012, which is incorporated herein by reference.

b) The remote maintenance center next calculates a HASH function of the encrypted Recovery Key, and the last valid date of the Recovery Key. The HASH function may be, for example, SHA.

c) Next, the remote maintenance center encrypts the HASH value, for example, using RSA, with a vendor private key. The result of the encryption is referred to as Token Signature below.

d) The remote maintenance center now creates a Maintenance Key Update File, comprising the encrypted Recovery Key, the last valid date, and the Token Signature, and sends it to the processor.

e) The processor decrypts the Token Signature, using the vendor public key, to get the HASH function of step c) above f) Next, the processor performs RSA decryption to get the new Recovery Key. A special Maintenance public key is used in this step, which is different from the regular public key that is used for FW Updates. The purpose is to prevent an untrusted user who has access to the FW Update Public key from getting access to plain-text visibility of the new Recovery Key.

g) The Maintenance Key Update File acts as a time-constrained certificate, intended to assure that it cannot be used once it expires. The processor will update the Recovery Key only if the current time value is smaller than the expiration time; that is—the valid date has not expired yet.

In summary, the methods described herein facilitate secure boot when the boot code is compromised or otherwise corrupted, by using a Recovery Key to securely reprogram a Recovery Boot code and then securely boot from the recovery boot, as well as securely programming a new recovery key from a remote center.

System Description

Figure 1:
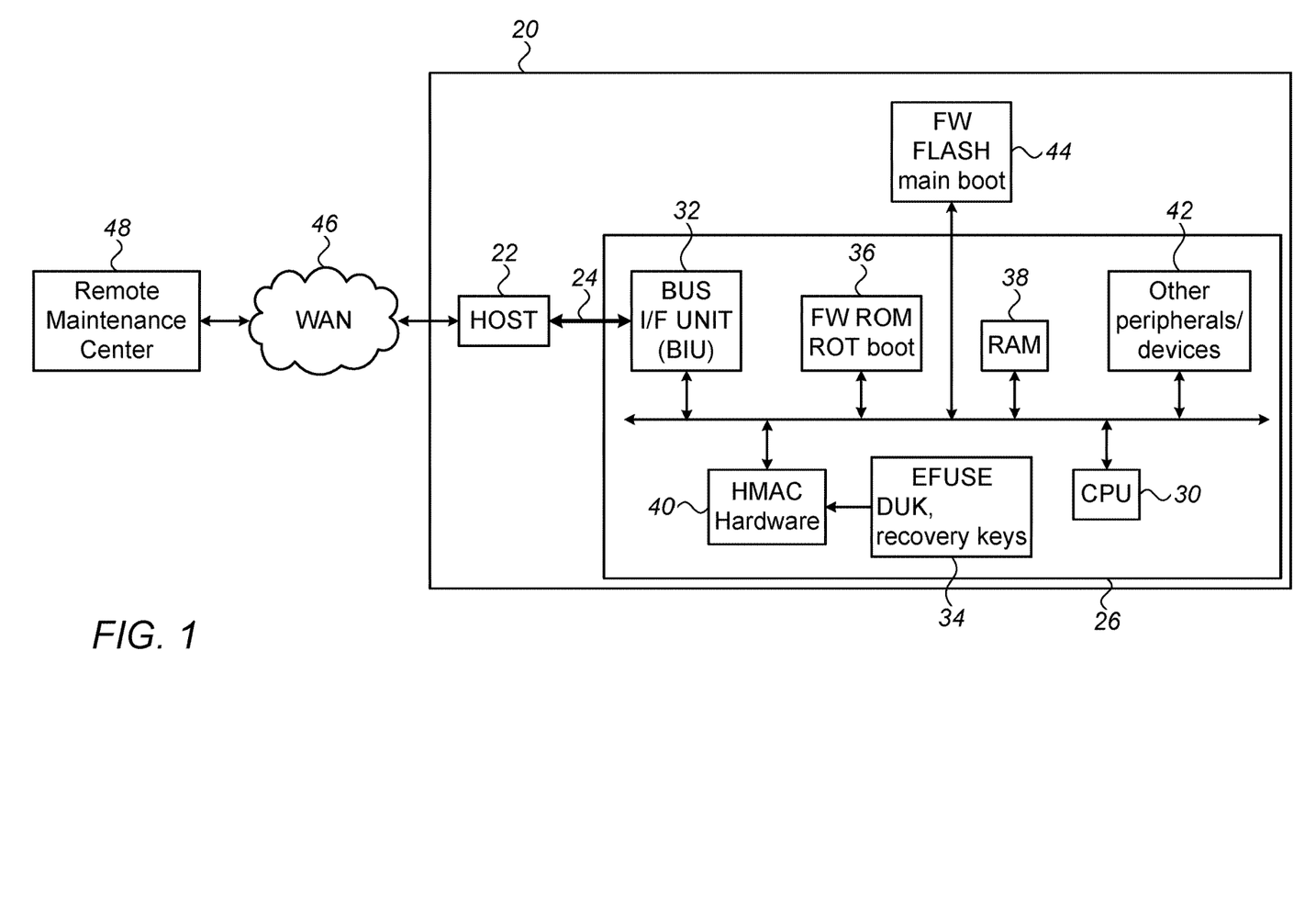
FIG. 1 is a block diagram that schematically illustrates a computer system, in accordance with an embodiment of the present invention.

FIG. 1 is a block diagram that schematically illustrates a Computer System 20, according to embodiments of the present invention. Computer System 20 comprises a processor 26, communicating over a system bus 24 with a Host 22, and possibly with other peripherals (not shown). An example of a suitable system bus is PCI Express (PCIe), defined in "PCI Express® Base Specification," Revision 4.0, Version 0.3, Feb. 19, 2014, which is incorporated herein by reference. Alternatively, any other suitable system bus can be used.

Computer System 20 communicates, through Host 22, with a wide-area-network (WAN) 46. A Remote Maintenance Center 48 is a computer system, which also communicates with WAN 46. Remote Maintenance Center 48 is used, among other tasks, to update the software and/or firmware of computer system 20. WAN 46 may communicate with additional computer systems (not shown).

Processor 26 comprises a Central Processing unit (CPU) 30, a Bus Interface Unit (BIU) 32, an electronic fuse unit (EFUSE) 34, a FW-ROM 36, a Random Access Memory (RAM) 38, HMAC Hardware 40 and other peripherals 42. The Initial boot FW is stored in ROM 36, and main boot FW is stored in a FW Flash 44.

According to an embodiment, the boot code stored in FW ROM 36 is Root of Trust boot code, which is not authenticated in the boot process and is assumed to be unconditionally trusted.

According to some embodiments, FW FLASH 44, which stores the main boot functions, may be external to computer system 26. In some embodiments, FW FLASH 44 may contain a single boot code; in other embodiments the boot code of FW FLASH 44 may comprise several levels of boot codes, for example time-critical and non-time-critical.

In accordance with embodiments of the present invention, the code stored in EFUSE 34 may comprise a Device Unique Key (DUK) and one or more Recovery Keys.

In some embodiments, CPU 30 is configured to authenticate the contents of the boot FW code located in FW Flash 44 by calculating a certain encryption function of the boot code and a Key, which may be stored in EFUSE 34, and comparing the result with an expected result value stored in FW FLASH 44. In an embodiment, the encryption function may be HMAC, described in NIST Publication 198-1, cited above.

According to embodiments of the present invention, upon reset or power-up, processor 26 a) authenticates the boot code, stored, for example, in FW FLASH 44, using the DUK; and, b) if the authentications fails, authenticates the boot code with a recovery key.

According to embodiments of the present invention, when processor 26 is operating in secured recovery mode, BIU 32 is configured to enable Host 22 to store new boot code through System Bus 24, in FW FLASH 44. According to an embodiment, storing of the new boot code will only be possible when processor 26 is operating in a Secure Recovery Mode, indicated by CPU 30.

According to an embodiment, during the time processor 26 executes the initial boot, it will be in an operational mode in which accesses over system-bus 24 are prohibited, and thus, the contents of FW Flash 44 cannot be modified.

The configurations of computer system 20, and its components such as processor 26, as shown in FIG. 1, are example configurations that are shown purely for the sake of conceptual clarity. Any other suitable configurations can be used in alternative embodiments.

The different elements of computer system 20 and processor 26 may be implemented using suitable hardware, such as in an Application-Specific Integrated Circuit (ASIC) or Field-Programmable Gate Array (FPGA), using software, or using a combination of hardware and software elements.

In some embodiments, CPU 30, Host 22 and/or remote management center 48 comprise general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Figure 2:
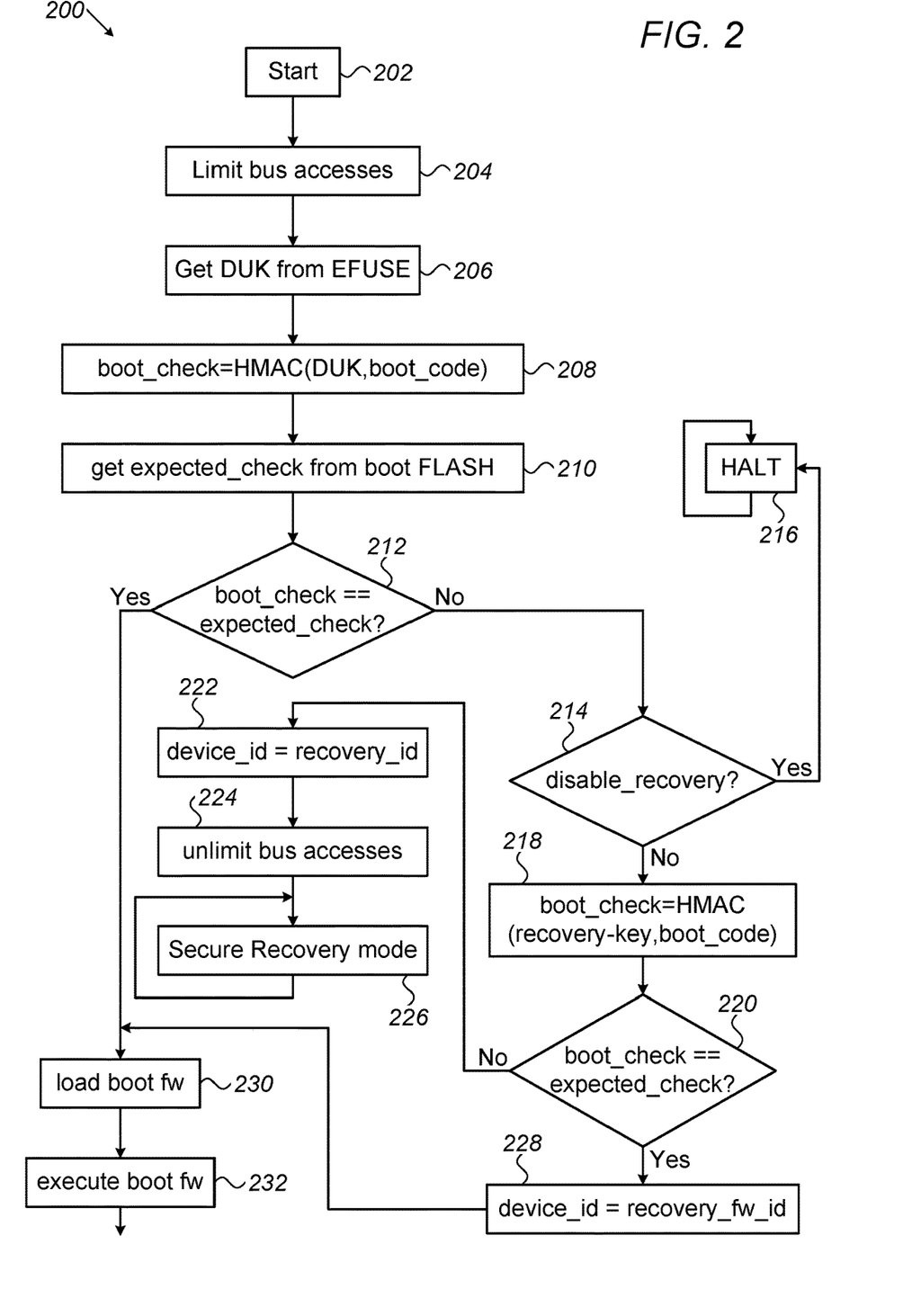
FIG. 2 is a flow chart that schematically illustrates a method for secure bootstrapping, in accordance to embodiments of the present invention.

FIG. 2 is a flow chart 200 that schematically illustrates a method for facilitating secure boot of processor 26 (FIG. 1), according to some embodiments of the present invention. The method begins with the processor starting, for example after reset, at a starting-step 202. At a limit-bus-access step 204 processor 26 may limit accesses to the system bus, to protect against unauthorized accesses. For example, if system bus 24 is PCI Express®, processor 26 may force Configuration Retry Status (CRS) flag to True (CRS is described in chapter 2 of PCI Express® base specifications, revision 3.0, which is cited above).

After step 204, processor 26 enters a DUK Getting step 206, in which the processor reads a device-unique key DUK from EFUSE 34 (FIG. 1). Next, in a Boot-Check Calculation step 208, processor 26 calculates an HMAC function on the boot code from FW-FLASH 44 (FIG. 1) and the DUK.

At a getting-expected-check step 210, processor 26 reads the expected check results which are stored in FW FLASH 44, and in a comparing-check step 212, the processor compares the value of the expected check to the value of the boot check obtained in step 208.

If, at step 212, the value of the expected check is not equal to the value of the boot check obtained in step 208, processor 26 enters disable-recovery-checking step 214. If a Disable-Recovery Mode is set, processor 26 will then enter Halt state 216, and stay there until reset.

If, at step 214, Disable-Recovery Mode is not set, processor 26 will enter a boot-check calculation step 218 in which the processor will calculate an HMAC function of the boot code from FW-FLASH 42 and of a Recovery Key, stored in EFUSE 34, and then enter a comparing-check step 220, in which the value of the expected check compared to the value of the boot check obtained in step 218.

If, at step 220, the value of the expected check is not equal to the value of the boot check obtained in step 218, processor 26 enters a setting-device-id step 222, and sets the ID of the device to a recovery ID. Processor 26 then enters unlimiting-bus-accesses step 224, in which the processor allows bus accesses, for example by setting the Configuration Retry Status (CRS) flag to False. After step 224 processor 26 enters a secure-recovery-mode step 226, where the processor will stay until reset.

If, at step 220, the value of the expected check is equal to the value of the boot check obtained in step 218, processor 26 will enter setting-device-id step 228, where it will set the device ID equal to a recovery-FW ID.

Processor 26 enters loading-boot-FW step 230 in two cases—a) if at step 212 the value of the expected check is equal to the value of the boot check obtained in step 208; or b) if, after step 228. When in step 230, processor 26 loads the boot code from FW Flash 44, and then enters FW execution step 232, executes the boot and exits the current flow chart.

Figure 3:
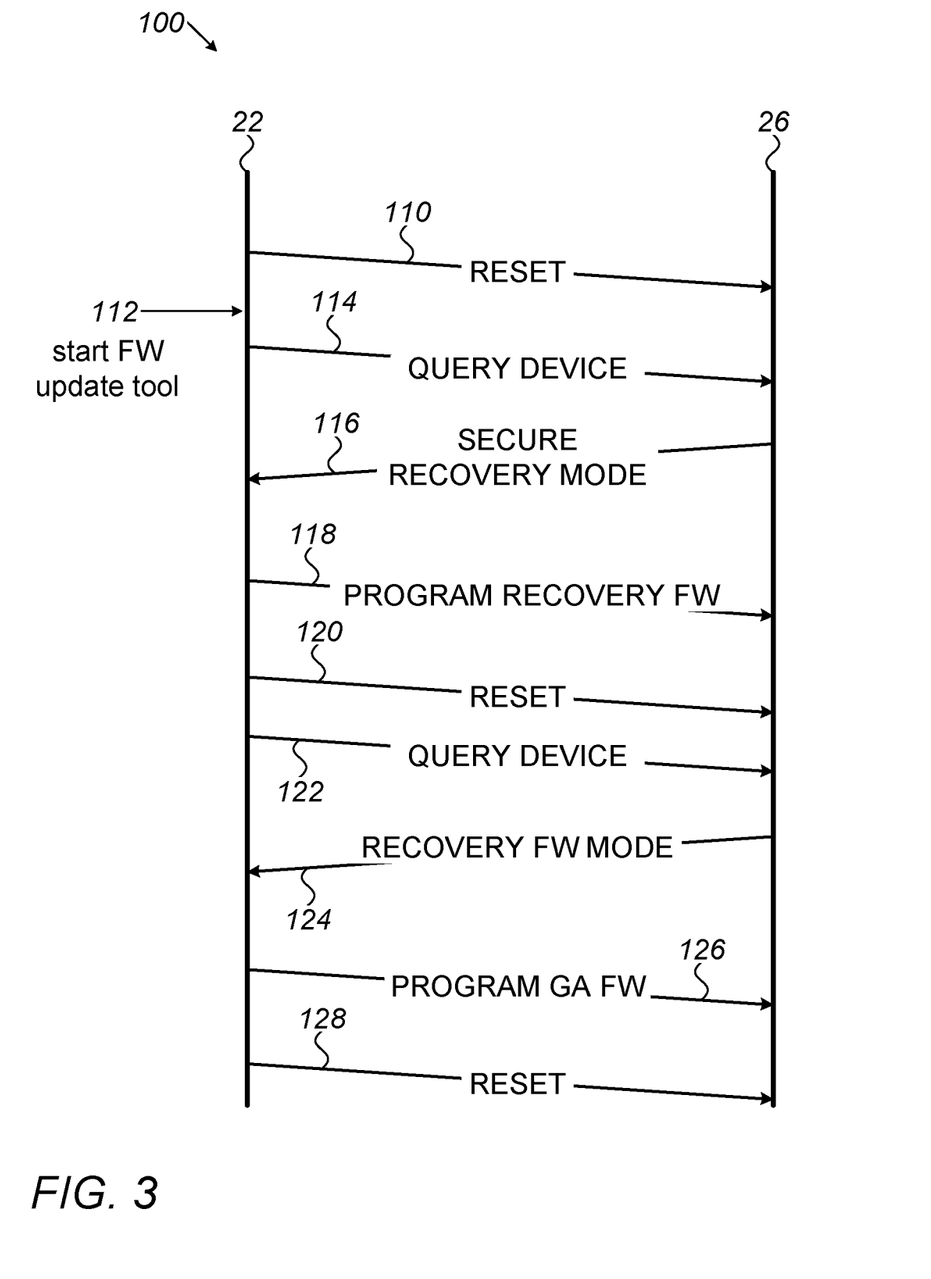
FIG. 3 is schematic illustration of the flow of a failing local boot followed by programming of recovery firmware and recovery-mode boot, in accordance to embodiments of the present invention.

FIG. 3 is schematic illustration of a signal flow 100 of a failing local boot followed by programming of recovery firmware and recovery-mode boot, according to some embodiments of the present invention. The signals are exchanged between Host 22 and Processor 26 (FIG. 1).

The flow starts with a Reset Step 110, where Host 22 asserts a Global Reset system function. This reset is applied to processor 26, which will attempt to boot, for example, according to flow 200 (described above).

Next, host 22 launches a firmware update software tool (112), which will initiate all further host operations of flow 100. At a Query Step 114 host 22 queries the status of processor 26. In response, at a Sending-Response Step 116, processor 26 sends a message indicating that it is in a Secure Recovery Mode.

At a Programming Recovery FW step 118, The tool running on host 26 programs a recovery FW into processor 26 (which authenticates the recovery FW and stores it in FW Flash 44, as described, for example, in flow 200 above).

At a Reset Step 120 host 22 once again resets processor 26, which will attempt to boot, this time with the Recovery FW programmed in step 118. When host 22 next checks the mode of processor 26 (at a Query Step 122), the processor will send, at a Sending Response step 124, a message indicating that it is in Recovery FW mode.

Next, at a Programming GA FW step 126, host 22 programs the GA FW into processor 26, which authenticates and signs the GA FW and stores it in FW Flash 44. When host 22 next resets processor 26 at a Resetting Step 128, processor 26 will boot normally, with the GA FW.

Figure 4:
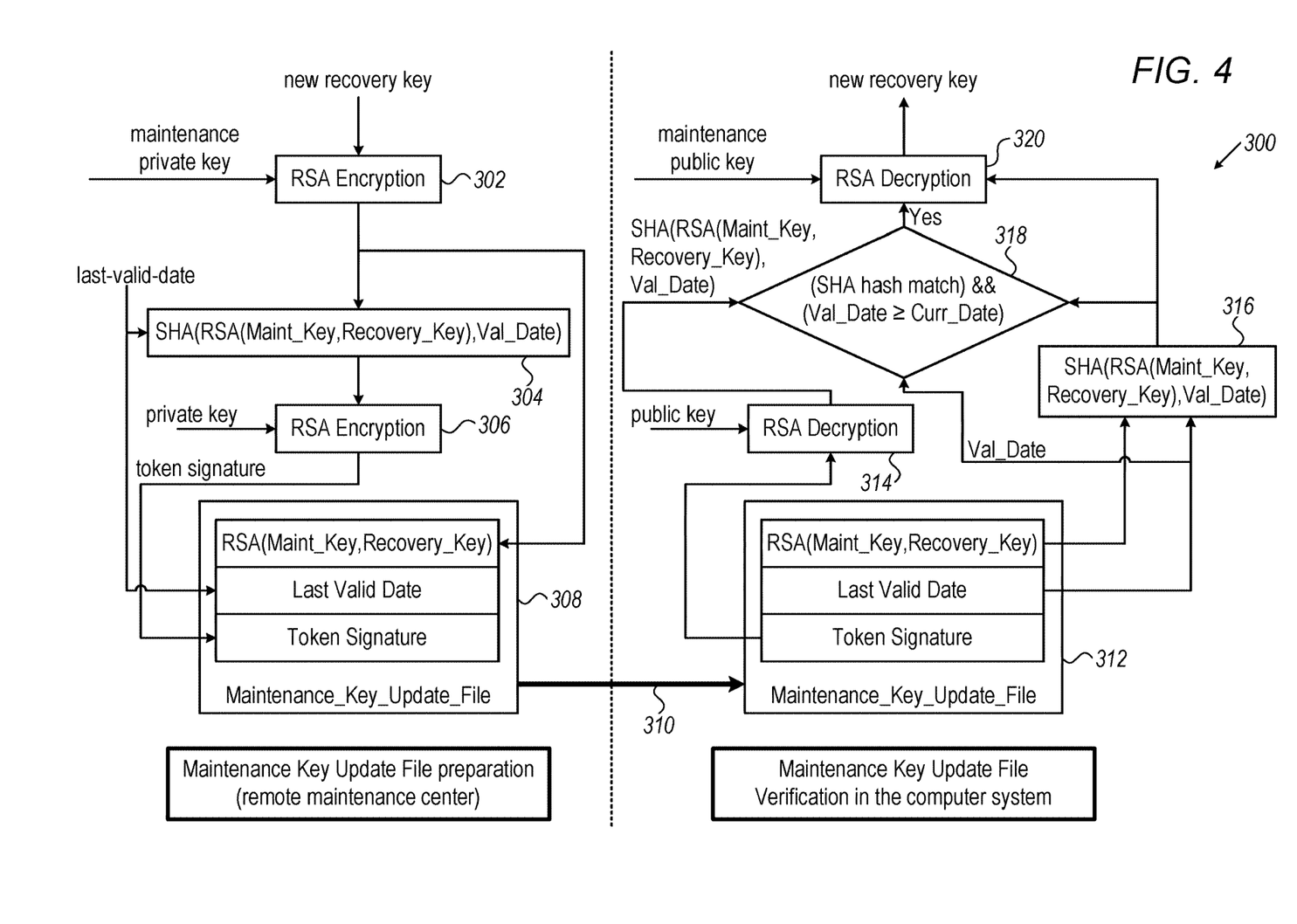
FIG. 4 is schematic illustration of the flow of the update process of a recovery key.

FIG. 4 is a flow chart 300 that schematically illustrates the process of sending and applying a new Recovery Key by remote maintenance center 48 (FIG. 1), according to embodiments of the present invention. The process starts at an asymmetric encryption such as RSA Encryption step 302, wherein a computer in the remote-maintenance center encrypts the new recovery key with a special maintenance private-key, using, for example, RSA Encryption.

After RSA Encryption step 302, the computer of the remote maintenance center enters a hash calculation such as SHA Calculation Step 304, wherein a HASH function of the encrypted recovery key generated in step 302, and the last valid date assigned for the application of the new recovery key, is calculated, using, for example, SHA algorithm.

After SHA Calculation Step 304, the computer of the remote maintenance center enters an asymmetric encryption RSA Encryption step 306, wherein it encrypts the HASH function generated in step 304, using a private key. The result of this step is hereinafter referred to as Token Signature.

Next, in a Generating Maintenance-Key Update File step 308, the computer of the remote maintenance center generates a Maintenance Key-Update File comprising the encrypted recovery key generated in step 302, the last valid date assigned for the application of the new recovery key (which is also used in step 304), and the token signature generated in step 306.

In a sending-file step 310, the remote maintenance center sends the Maintenance Key-Update File over WAN 46 (FIG. 1), which is assumed to be insecure, to computer system 20.

The steps that are taken by computer system 20 to retrieve the new recovery key from the Maintenance Key Update File are the reverse of the steps taken by the computer of the remote maintenance center to generate the Maintenance Key Update File from the new recovery key:

In a Getting Maintenance Key-Update File step 312 computer system 20 gets the Maintenance Key Update File sent over WAN 46. The file comprises an encrypted-recovery-key field, a last-valid-date field and a token signature field.

Next, in an RSA Decryption step 314, computer system 20 decrypts the token signature part of the Maintenance Key-Update File from step 312 using asymmetric decryption algorithm such as an RSA algorithm and a public key.

In a SHA Calculation Step 316, the computer system calculates a HASH function of the encrypted recovery key and the last valid date fields which are stored in the Maintenance Key Update File retrieved in step 312. Step 316 is identical to step 304 if the encrypted-recovery-key field and the last-valid-date fields of the maintenance-key-update file retrieved in step 312 are identical to the corresponding fields of the Maintenance Key Update File of step 308; hence, if file transfer step 310 has not been tampered with, the output of step 316 will be identical to the output of step 304.

In a Checking Validity step 318, the computer system checks if the valid date of the Maintenance Key Update File is later than or equal to the current date, and if the output of step 314 is identical to the HASH function of the output of step 316. If both conditions are met, the processor next executes RSA Decryption step 320, wherein the encrypted recovery key value generated in step 316 is decrypted with the maintenance public key, using asymmetric decryption algorithm such as RSA algorithm.

In summary, the methods described herein facilitate secure boot when the boot code is compromised or otherwise corrupted, by using a Recovery Key to securely reprogram a Recovery Boot code and then securely boot from the recovery boot, as well as allowing for securely programming a new recovery key from a remote center.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

Although the embodiments described herein mainly address secure boot, the methods and systems described herein can also be used in other applications, such as in recovery methods for configuration files stored in Field-Programmable Gate Array (FPGA).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for secure boot, comprising:
   in a processor, retrieving from a memory device a firmware boot code for bootstrapping a firmware of the processor;
   authenticating the firmware boot code using a unique device key (DUK) associated with the processor and programmed during production time;
   in response to failing to authenticate the firmware boot code using the DUK, attempting to authenticate, using a recovery key which is distinct from the DUK, a recovery firmware code that has reduced functionality relative to the firmware boot code and that, when executed, restores and authenticates the firmware boot code; and
   upon successfully authenticating the recovery firmware code using the recovery key;
   restoring the firmware boot code from a host;
   authenticating the restored firmware boot code, including authenticating a signature of the firmware boot code using a public key, by executing the recovery firmware code;
   upon successfully authenticating the signature of the firmware boot code using the public key, signing the restored firmware boot code with the DUK, and writing the signed firmware boot code to the memory device; and
   bootstrapping the firmware using the authenticated firmware boot code.

2. The method according to claim 1, and comprising, in response to failing to authenticate the recovery firmware code using the recovery key, loading the recovery firmware code from the host.

3. The method of claim 1, wherein the reduced functionality of the recovery firmware code comprises authentication and signing of firmware boot codes.

4. A computer system, comprising:
   a memory device; and
   a processor, which is configured to:

retrieve from the memory device a firmware boot code for bootstrapping a firmware of the processor;

authenticate the firmware boot code using a unique device key (DUK) associated with the processor and programmed during production time;

in response to failing to authenticate the firmware boot code using the DUK, attempt to authenticate, using a recovery key which is distinct from the DUK, a recovery firmware code that has reduced functionality relative to the firmware boot code and that, when executed, restores and authenticates the firmware boot code; and upon successfully authenticating the recovery firmware code using the recovery key;

restore the firmware boot code from a host;

authenticate the restored firmware boot code, including authenticating a signature of the firmware boot code using a public key, by executing the recovery firmware code;

upon successfully authenticating the signature of the firmware boot code using the public key, sign the restored firmware boot code with the DUK, and write the signed firmware boot code to the memory device; and bootstrap the firmware using the authenticated firmware boot code.

5. The computer system according to claim 4, wherein, in response to failing to authenticate the recovery firmware code using the recovery key, the processor is configured to load the recovery firmware code from the host.

6. The computer system of claim 4, wherein the reduced functionality of the recovery firmware code comprises authentication and signing of firmware boot codes.

7. The method according to claim 1 and wherein the DUK is programmed into an electronic fuse unit (EFUSE).

8. The method according to claim 1, and wherein the processor has a device ID, and the method includes setting the device ID to a recovery ID.

9. The computer system according to claim 4 and wherein the DUK is programmed into an electronic fuse unit (EFUSE).

10. The computer system according to claim 4, and wherein the processor has a device ID, and the processor is configured to set the device ID to a recovery ID.

* * * * *